Figure 3:
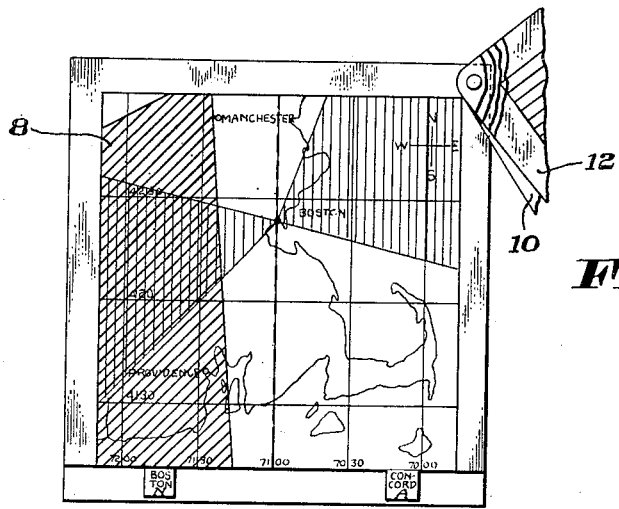

Feb. 27, 1945.                E. A. GUDITZ                 2,370,305
                    RADIO RANGE NAVIGATION DEVICE
                    Filed April 17, 1943        2 Sheets-Sheet 1
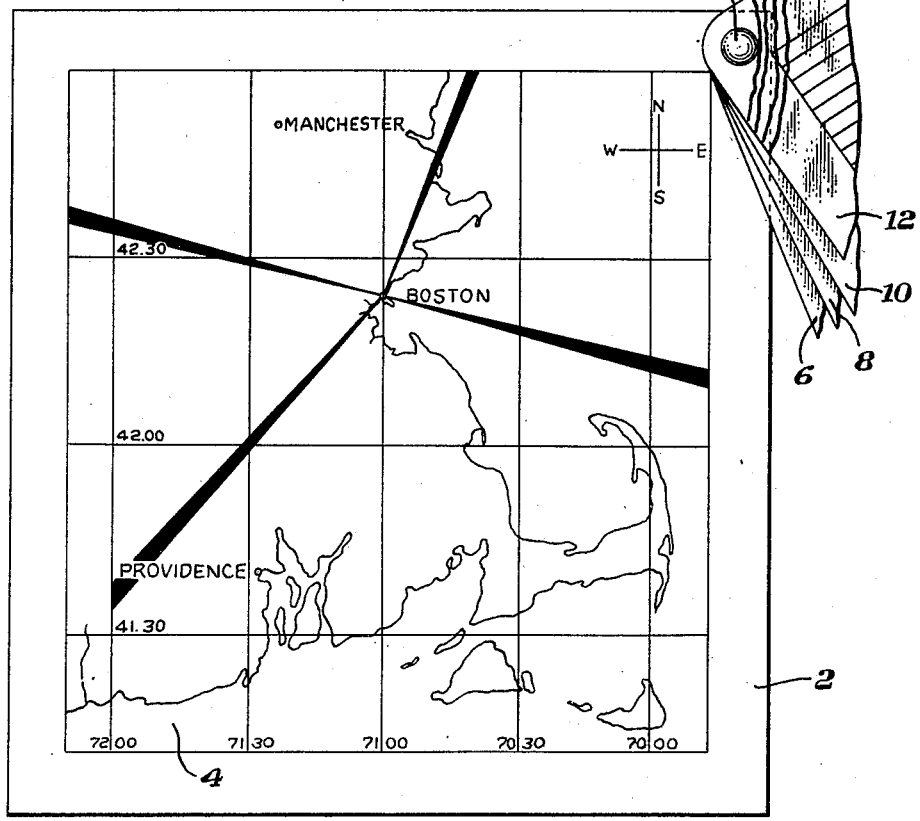
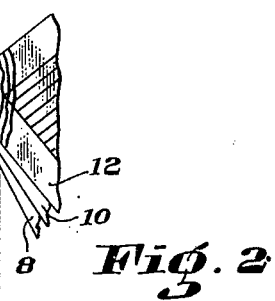
INVENTOR.
Elis A. Guditz
BY H. F. Kirkpatrick
ATTORNEY Feb. 27, 1945.  E. A. GUDITZ  2,370,305
RADIO RANGE NAVIGATION DEVICE
Filed April 17, 1943  2 Sheets-Sheet 2

INVENTOR.
Elis A. Guditz
BY H. L. Kirkpatrick
ATTORNEY

Patented Feb. 27, 1945

2,370,305

UNITED STATES PATENT OFFICE 2,370,305

RADIO RANGE NAVIGATION DEVICE

Elis A. Guditz, Dorchester, Mass.

Application April 17, 1943, Serial No. 483,446

7 Claims. (Cl. 35—12)

This invention relates to a radio range navigation device, and has for its object to provide a novel means for a pilot to approximately locate himself by utilizing and graphically recording possible positions according to signals received, at a given but unknown location, from a plurality of radio range stations, and without the necessity of flying through one of the various orientation procedures. As a practical matter, it often is not feasible to employ an orientation procedure, on account of shortage of fuel, and, even if such a procedure were employed, it would not establish the distance from any given radio range station, but, instead, simply establishes on which leg of a given range the pilot is located at some unknown distance from the station. The real purpose of the present device is to enable a pilot, by means of using a plurality of ranges, to localize himself expeditiously and, commonly, even when remote from any leg of a radio range.

Figure 4:
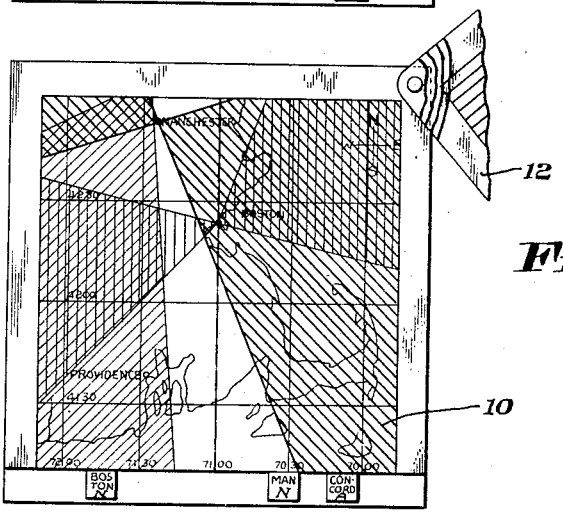
Figure 5:
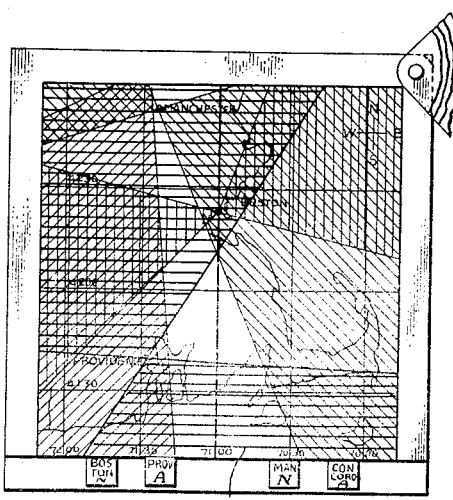

In the drawings, which illustrate the preferred form of the device as applied to a typical area, Fig. 1 is a plan view of the device (partly broken away) and including a typical map portion;

Fig. 2 is a view of Fig. 1 plus the addition of one of the radio range pivoted members in position over the map; and Figs. 3, 4 and 5 likewise represent the showing of Fig. 2 plus additional radio range members superposed in place over the map, Fig. 3 having two members thus superposed, Fig. 4 three, and Fig. 5 four of the members are employed in the particular problem to be described.

Referring to the drawings in which like numerals represent like parts, the device consists of a rigid or semi-rigid base member 2 having affixed thereto a map 4 which may conveniently cover an area of, say, 125-200 miles square, depending somewhat on the particular area in question. A typical map here shown represents a portion of southeastern New England including Rhode Island, eastern Massachusetts, and the southern part of New Hampshire, and in practice could be used, for example, in connection with an aerial patrol basing at Boston. The operation of the device will be explained in connection with a typical situation involving the use thereof from which the structure and use of the device will clearly appear. For example, a plane approaching Boston from the southward has been proceeding "on instruments" for some time and hence without definite knowledge of position (assuming no radio fixes) and desires to approximately locate itself as soon as possible. In this particular case, and beginning with the device as shown in Figs. 1 and 2, the pilot tunes to the frequency of the Boston radio range station and, upon hearing an "N" signal, pulls down into position the transparency 6 (which conveniently may be made of photographic film) so arranged and pivoted on the pin 5 as to properly correspond with the map 4 when swung into position over the map as shown in Fig. 2. This transparency 6, as shown in Fig. 2, is hatched in the "A" quadrants so as to partially obscure the map, the purpose of this being to eliminate the "A" quadrants from the pilot's consideration inasmuch as the signal heard was an "N" from Boston. For this problem, he does not use the other oppositely cross-hatched one of the pair of transparencies for the Boston range. Having thus established and recorded by means of the now positioned transparency 6 that he is either in the clear or transparent upper or lower "N" Boston quadrant, he next tunes in some different radio range station on a different frequency, for example, Concord, N. H., the result being that he hears the Concord "A." He then pulls down into position over the map 4, either above or below the transparency 6, the transparency 8 corresponding to the Concord "A" signal which eliminates from consideration the diagonally cross-hatched "N" area of the Concord range, as shown in Fig. 3. This further localizes the pilot and establishes that he is not far west of Boston, if, indeed, west of Boston at all. We shall now assume the pilot tunes to the frequency of the Manchester range station, and from it hears the "N," whereupon he pulls into superposed position the transparency 10, as shown in Fig. 4, which eliminates from consideration the two diagonally hatched "A" quadrants of the Manchester range station, thus leaving but three possibilities, as shown in Fig. 4, namely, the "N" quadrant above Manchester and extending off of the map, the small vertical triangle immediately below Manchester, and the long irregular quadrilateral shaped space extending to the southward of Boston. The pilot, then, for example, tunes in the Providence range station and, hearing the "A," pulls down the corresponding transparency 12 for the Providence "A" and, upon moving it into position, as shown in Fig. 5, has thus eliminated all the areas except the triangle of approximately 30 miles on the side between Providence and Boston. Thus, without the necessity of employing the orientation procedure and within a matter of two or three minutes the pilot, though completely "blind," is usually able to localize himself and obtain a fairly definite fix by simply tuning in a series of radio range stations and putting in position over the map the appropriate one of the two transparencies for each station according to the signal heard from said station.

Naturally, the locations of radio range stations vary with each locality and, according to the orientation of the legs of the particular range being received, but, there being, preferably, a pair of transparencies for each radio range station within easy range of his receiver, with each of said pairs having distinctive marking indicating "A" and "N" quadrants of said range, the highly desired localizing provided by the invention may be secured. Though localities and positions of radio range stations also vary relatively, the device finds use for every locality of sufficient size so as to include a minimum of two or three radio ranges. It will be appreciated that though I preferably employ cross-hatching to designate "eliminated" quadrants, other means may be employed, such as shading or even employing opaque portions. In either case, the same result is secured.

Having described my invention, what I claim is:

1. A radio range navigation device having in combination with a map portion a series of movable members, said members indicating quadrants of a plurality of radio ranges and being adapted to be selectively disposed in superposed relation over said map according to the signals heard at any given but unknown location and thereby localize and approximately graphically fix the location at which the signals of the plurality of ranges are heard.

2. A radio range navigation device having in combination with a map portion a series of pivotally mounted transparent movable members, sa'd members indicating quadrants of a plurality of radio ranges and being adapted to be selectively disposed in superposed relation over said map according to the signals heard at any given but unknown location and thereby localize and approximately graphically fix the location at which the signals of the plurality of ranges are heard.

3. A radio range navigation device having in combination with a map portion a series of transparent movable members, said members indicating quadrants of a plurality of radio ranges and being adapted to be selectively disposed in superposed relation over said map according to the signals heard at any given but unknown location and thereby localize and approximately graphically fix the location at which the signals of the plurality of ranges are heard.

4. A radio range navigation device having in combination with a map portion at least two pairs of movable members, each of said pairs indicating respective A and N quadrants of a given radio range, the members of each of said pairs being adapted to be selectively disposed in superposed relation over said map according to the signals heard at any given but unknown location and thereby localize and approximately graphically fix the location at which the signals of a plurality of ranges are heard.

5. A radio range navigation device having in combination with a map portion, and pivotally affixed with respect thereto, at least two pairs of movable members, each of said pairs indicating respective A and N quadrants of a given radio range, the members of each of said pairs being adapted to be selectively disposed in superposed relation over said map according to the signals heard at any given but unknown location and thereby localize and approximately graphically fix the location at which the signals of a plurality of ranges are heard.

6. A radio range navigation device having in combination with a map portion at least two pairs of movable transparent members, each of said pairs indicating and partially obscuring respective opposing A and N quadrants of a given radio range, the members of each of said pairs being adapted to be selectively disposed in superposed relation over said map according to the signals heard at any given but unknown location and thereby localize and approximately graphically fix the location at which the signals of a plurality of ranges are heard.

7. A radio range navigation device having in combination with a map portion at least two pairs of movable transparent members, each of said pairs indicating respective A and N quadrants of a given radio range, the members of each of said pairs being adapted to be selectively disposed in superposed relation over said map according to the signals heard at any given but unknown location and thereby localize and approximately graphically fix the location at which the signals of a plurality of ranges are heard.

ELIS A. GUDITZ.